United States Patent [19]
Stevens et al.

[11] Patent Number: 5,426,765
[45] Date of Patent: Jun. 20, 1995

[54] MULTIPROCESSOR CACHE ABITRATION

[75] Inventors: Jeffrey C. Stevens, Spring; Mike T. Jackson, Houston; Roger E. Tipley, Houston; Jens K. Ramsey, Houston; Sompong Olarig, Cypress; Philip C. Kelly, Houston, all of Tex.

[73] Assignee: Compaq Computer Corporation, Houston, Tex.

[21] Appl. No.: 227,303

[22] Filed: Apr. 13, 1994

Related U.S. Application Data

[63] Continuation of Ser. No. 753,199, Aug. 30, 1991, abandoned.

[51] Int. Cl.⁶ .............................................. G06F 12/00
[52] U.S. Cl. ................. 395/425; 364/DIG. 1; 364/DIG. 2; 364/243; 364/243.4; 364/243.41; 364/964; 364/964.2; 364/964.27
[58] Field of Search ............. 364/DIG. 1 MS File, 364/DIG. 2 MS File; 395/425, 725, 375, 800

[56] References Cited

U.S. PATENT DOCUMENTS

| | | | |
|---|---|---|---|
| 4,959,777 | 9/1990 | Holman, Jr. | 395/425 |
| 5,025,365 | 6/1991 | Mathur et al. | 395/600 |
| 5,043,886 | 8/1991 | Witek et al. | 395/425 |
| 5,072,369 | 12/1991 | Theus et al. | 395/425 |
| 5,097,409 | 3/1992 | Schwartz et al. | 395/425 |
| 5,113,510 | 5/1992 | Hillis | 395/425 |
| 5,119,485 | 6/1992 | Ledbetter, Jr. et al. | 395/425 |
| 5,151,979 | 9/1992 | Poskitt | 395/325 |
| 5,226,144 | 7/1993 | Moriwaki et al. | 395/425 |

OTHER PUBLICATIONS

James Archibald and Jean–Loup Baer, "An Evaluation of Cache Coherence Solutions in Shared-Bus Multiprocessors," Oct. 18, 1985, pp. 1–32.

Paul Sweazey and Alan Jay Smith, "A Class of Compatible Cache Consistency Protocols and their Support by the IEEE Futurebus," 13th International Symposium on Computer Architecture 1986, pp. 414–423.

James R. Goodman, "Using Cache Memory to Reduce Processor–Memory Traffic," 1983, pp. 124–131.

*Primary Examiner*—Robert B. Harrell
*Attorney, Agent, or Firm*—Pravel, Hewitt, Kimball & Krieger

[57] ABSTRACT

A method for arbitrating between processor and host bus snoop accesses to a cache subsystem in a multiprocessor system where the processor does not allow for processor cycle aborts. When a processor access and a snoop access both occur and no tag access or tag modify cycle is currently being performed, the snoop access is given priority over the processor access. After an initial arbitration, if any, the processor and snoop accesses alternate tag access if both processor and snoop accesses are active. This balances any wait states incurred between the processor and the host bus and ensures that neither bus is locked out by continual accesses by the other. In addition, tag modify cycles are generally run immediately after the tag access cycles that initiate them.

16 Claims, 4 Drawing Sheets

MULTIPROCESSOR CACHE ABITRATION

This is a continuation of application Ser. No. 07/753,199, filed on Aug. 30, 1991, now abandoned.

BACKGROUND OF THE INVENTION

1. Field of the Invention

The present invention relates to microprocessor cache subsystems in computer systems, and more specifically to an arbitration scheme for a dual-ported cache used in a multiprocessor, multiple cache environment.

2. Description of the Prior Art

The personal computer industry is a vibrant and growing field that continues to evolve as new innovations occur. The driving force behind this innovation has been the increasing demand for faster and more powerful computers. Historically, computer systems have developed as uniprocessor, sequential machines which can execute one instruction at a time. However, performance limits are being reached in single processor computer systems, and therefore a major area of research in computer system architecture is multiprocessing. Multiprocessing involves a computer system which includes multiple processors that work in parallel on different problems or different parts of the same problem. The incorporation of multiple processors in a computer system introduces many design problems that are not encountered in single processor architectures. One difficulty that has been encountered in multiprocessing architectures is the maintenance of cache coherency when each processor includes its own local cache. Therefore, one area of research in multiprocessor architectures has been methods and techniques to maintain cache coherency between multiple caches in a multiprocessor architecture.

Cache memory was developed in order to bridge the gap between fast processor cycle times and slow memory access times. A cache is a small amount of very fast, and expensive, zero wait state memory that is used to store a copy of frequently accessed code and data from main memory. A microprocessor can operate out of this very fast memory and thereby reduce the number of wait states that must be interposed during memory accesses. When the processor requests data from memory and the data resides in the cache, then a cache read hit takes place, and the data from the memory access can be returned to the processor from the cache without incurring wait states. If the data is not in the cache, then a cache read miss takes place, and the memory request is forwarded to the system and the data is retrieved from main memory, as would normally be done if the cache did not exist. On a cache miss, the data that is retrieved from memory is provided to the processor and is also written into the cache due to the statistical likelihood that this data will be requested again by the processor.

An efficient cache yields a high "hit rate", which is the percentage of cache hits that occur during all memory accesses. When a cache has a high hit rate, the majority of memory accesses are serviced with zero wait states. The net effect of a high cache hit rate is that the wait states incurred on a relatively infrequent miss are averaged over a large number of zero wait state cache hit accesses, resulting in an average of nearly zero wait states per access. Also, since a cache is usually located on the local bus of its respective microprocessor, cache hits are serviced locally without requiring use of the host bus. In this manner, each of the various processors can operate out of its local cache when it does not have control of the host bus, thereby increasing the efficiency of the computer system. In systems without microprocessor caches, each of the processors generally must remain idle while it does not have control of the host bus. This reduces the overall efficiency of the computer system because the processors cannot do any useful work at this time. However, if each of the processors includes a cache placed on its local bus, it can retrieve the necessary code and data from its cache to perform useful work while other processors or devices have control of the host bus, thereby increasing system efficiency. Therefore, processors operating out of their local cache in a multiprocessor environment have a much lower "bus utilization." This reduces the system bus bandwidth used by each of the processors, making more bandwidth available for other processors and bus masters.

Cache management is generally performed by a device referred to as a cache controller. A principal cache management responsibility in multiprocessor systems is the preservation of cache coherency. The type of cache management policy used to maintain cache coherency in a multiprocessing system generally depends on the architecture used. One type of architecture commonly used in multiprocessing systems is referred to as a bus-based scheme. In a bus-based scheme, system communication takes place through a shared bus, and this allows each cache to monitor other cache's requests by watching or snooping the bus. Each processor has a cache which monitors activity on the bus and in its own processor and decides which blocks of data to keep and which to discard in order to reduce bus traffic. Requests by a processor to modify a memory location that is stored in more than one cache requires bus communication in order for each copy of the corresponding line to be marked invalid or updated to reflect the new value.

Various types of cache coherency protocols can be employed to maintain cache coherency in a multiprocessor system. One type of cache coherency protocol that is commonly used is referred to as a write-through scheme. In a write-through scheme, all cache writes or updates are simultaneously written into the cache and to main memory. Other caches on the bus must monitor bus transactions and invalidate any matching entries when the memory block is written through to main memory. In another protocol known as a write-back scheme, a cache location is updated with the new data on a processor write hit, and main memory is generally only updated when the updated data block must be exchanged with a new data block.

Multiprocessor cache systems which employ a write-back scheme generally utilize some type of ownership protocol to maintain cache coherency. In this scheme, any copy of data in a cache must be identical to (or actually be) the owner of that location's data. The owner of a location's data is generally defined as the memory unit having the most recent version of the data residing in a respective memory location. Ownership is generally acquired through special read and write operations defined in an ownership protocol.

The cache controller includes a directory that holds an associated entry for each data entry or set in the cache. In multiprocessor architectures, this entry generally includes two components: a tag and a number of tag state bits for each of the respective lines in each cache set. The tag acts as a main memory page number, and it holds the upper address bits of the particular page in main memory from which the copy of data residing in the respective set of the cache originated. The tag state bits determine the status of the data in the respective set of the cache, i.e. whether the data is invalid, owned, or shared with an another cache, etc.

In addition to responding to accesses from its local processor for data, each cache controller in a multiprocessor system generally includes a snooping mechanism which monitors the bus during memory accesses (reads and writes) by other processors and devices. The cache controller compares the addresses on the bus during these cycles with the tag values stored in its tag RAM's to determine if the data being accessed resides in the cache. If the accessed data resides in the cache, then a snoop hit has occurred. If a snoop read hit occurs to an owned location during an external read request, the cache controller inhibits or aborts the current memory cycle and accesses its cache memory to supply the owned data. If a snoop write hit occurs during an external write, the cache controller generally invalidates data in its cache memory written by another processor.

In common multiprocessor designs, several different buses are present in the computer system. A local processor bus is associated with each processor and its cache. The processors and related caches are then located on a host bus, which preferably includes the main memory in the computer system. The host bus is coupled by a controller and various buffers and latches to an input/output (I/O) bus used for connecting various peripheral devices or bus masters. Examples of I/O buses are the ISA or industry standard architecture based on the IBM Corp. PC/AT and the EISA or extended industry standard architecture.

In general, a local processor access and a host bus snoop access each require one clock cycle to access the tag RAM's to determine if a hit or miss has occurred. This cycle is generally referred to as a tag compare cycle. Many accesses also generally require a cycle for a tag update, referred to as a tag modify cycle, to alter the state bits in the tag.

As previously discussed, in a multiprocessor architecture, a cache controller generally must be able to service its local processor while also snooping the host bus. This requires that a cache system in a multiprocessor system have some type of dual ported scheme. In one dual ported scheme, the cache system can service accesses from both the local processor and the host bus, but only one access to the cache system can be made at a time. This scheme is desirable because it prevents the local processor and the snooping mechanism in the cache controller from both updating a cache entry at the same time, thereby preventing cache coherency problems from occurring.

Problems may arise using this type of dual ported scheme if one of either the local processor or the host bus is locked out of access to the cache system by the other. This problem is especially crucial in multiple processor systems where the cache controller must be guaranteed access to host bus cycle snoop accesses for cache coherency reasons. For example, if the cache was servicing its local processor and a snoop request occurred, the cache may not complete its processor access in time to snoop the host bus. In systems where the local processor allows for processor cycle aborts, this is generally not a problem since the cache controller can abort the current processor cycle and immediately respond to the snoop access. However, many processors do not allow processor cycle aborts, one of which is the Intel Corporation (Intel) 80386 microprocessor. In some systems it may be possible for a respective cache system to insert wait states in a processor bus or host bus cycle to delay the cycle until the cache has had a chance to snoop the access. However, if the bus cycle was originated by a device on a separate I/O bus which cannot have its cycles delayed, then problems may arise if the snoop access is not serviced immediately.

Therefore, this type of dual ported cache architecture requires some type of arbitration scheme to guarantee that the local processor and the host bus have equal access to the cache system. In addition, the arbitration scheme must guarantee that all host bus snoop requests receive access to the cache system for cache coherency reasons. Therefore, an arbitration scheme is desired which allows a cache system to efficiently service its local processor while also guaranteeing access to all snoop requests on the host bus to maintain cache coherency.

SUMMARY OF THE INVENTION

The present invention comprises a method and apparatus for arbitrating between host bus snoop accesses and processor accesses in a multiprocessor cache environment with minimal effect on system speed. The method is preferably used in systems where the local processor does not allow processor cycle aborts. When a processor access and a snoop access both occur while no tag access or tag modify cycle is currently being performed, the snoop access is given priority over the processor access. Snoop access priority is desirable for snoop writes because of the possibility of several consecutive zero wait state writes on the host bus. In this manner, a single zero wait state snoop write is allowed to complete, and only successive snoop write cycles may need to be delayed to guarantee snoop access. In addition, host bus reads or writes by ISA bus masters require priority over processor accesses because the cache controller must guarantee that the data requested on a snoop read can be driven back to the ISA bus in time when an inhibit cycle is required. This is necessary since the ISA bus is not delayed according to the preferred embodiment and hence has a fixed time that it can wait for a response.

After an initial arbitration, if any, the processor and snoop access alternate tag access if both processor and snoop accesses are active. In general, after a tag access by either the local processor or the host bus, the other has priority for the next tag access if it has a request pending and if the next tag cycle is not needed for a tag update cycle. This balances any wait states incurred between the processor and the host bus and ensures that neither is locked out by continual accesses by the other.

In addition, tag modify cycles almost always immediately follow the tag compare cycles that initiate them. The exception to this is when the local processor posts a write to a data entry that is shared with another cache. In this instance, the tag state is not updated until the data is actually broadcast to the host bus for cache coherency reasons.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

The following related disclosures are herein incorporated by reference:

U.S. application Ser. No. 07/753,420 entitled "Multiprocessor Cache Snoop Access Protocol" by Mike T. Jackson, Jeffrey C. Stevens, and Roger E. Tipley, filed on Aug. 30, 1991; now U.S. Pat. No. 5,335,335, and, U.S. application Ser. No. 07/752,761, now U.S. Pat. No. 5,325,504 entitled "LRU and Cache Write Tag RAM Protocol" by Roger E. Tipley, filed on Aug. 30, 1991, both of which are assigned to the same assignee as this invention.

Figure 1:
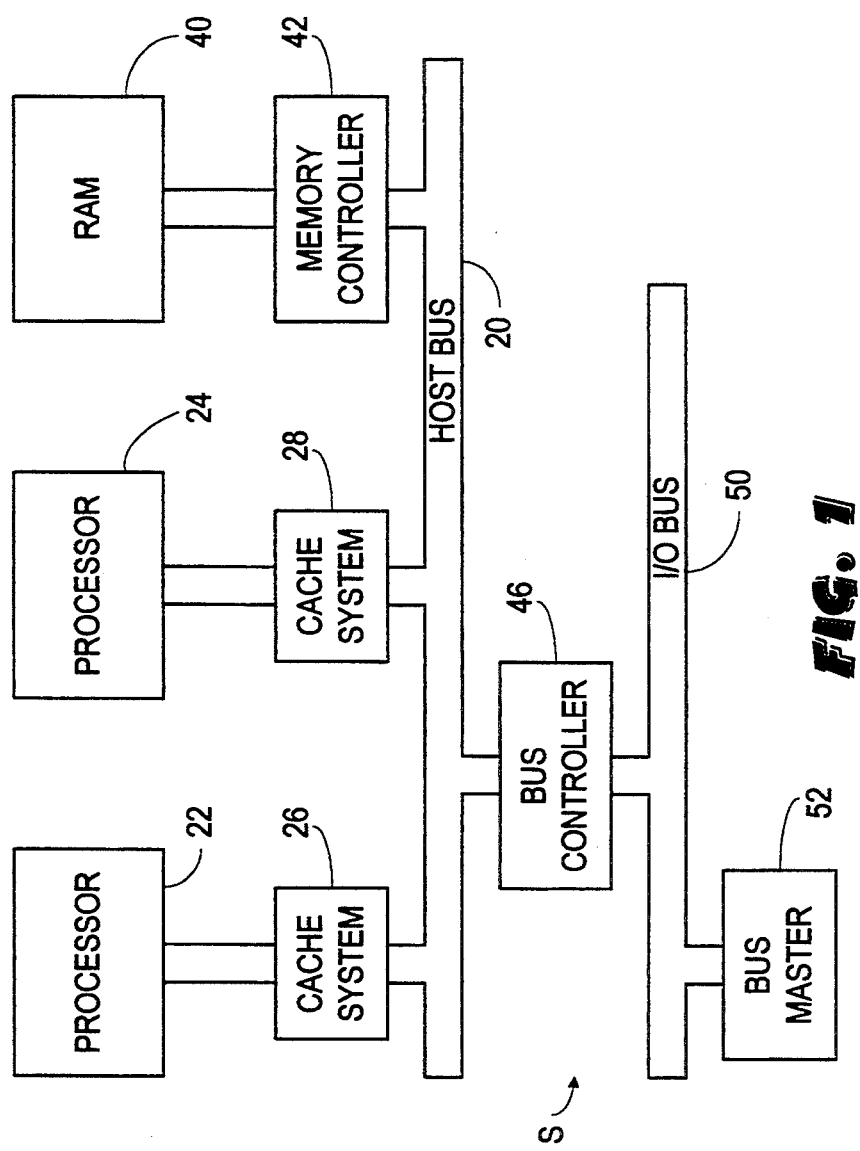
FIG. 1 is a block diagram of a multiprocessor computer system including multiple cache systems according to the present invention.

Referring now to FIG. 1, a computer system S is generally shown. Many of the details of a computer system that are not relevant to the present invention have been omitted for the purpose of clarity. In the preferred embodiment, the computer system S includes two microprocessors 22 and 24 that are coupled to a host bus 20. However, the use of a greater number of microprocessors is also contemplated. The processors 22 and 24 are preferably of the type which do not allow processor cycle aborts. In the preferred embodiment, the processors 22 and 24 are Intel 80386 microprocessors, but the use of other microprocessors is also contemplated. Cache subsystems 26 and 28 associated with each of the processors 22 and 24, respectively, are coupled between the respective processor 22 and 24 and the host bus 20. Each of the cache subsystems 26 and 28 includes cache controller arbitration (FIGS. 2 and 3) logic according to the present invention. Random access memory (RAM) 40 is preferably coupled to the host bus 20 through a memory controller 42, which controls the operation of the RAM 40. The RAM 40 and the memory controller 42 may hereinafter be referred to as main memory. The host bus 20 includes a control bus, a data bus and an address bus which allows access to data in main memory.

The host bus 20 is preferably coupled to an input/output (I/O) bus 50 through a bus controller chip 46. The I/O bus 50 is preferably based on the Extended Industry Standard Architecture (EISA). EISA is an extension of the Industry Standard Architecture (ISA), a bus architecture introduced in the International Business Machines Corporation (IBM) PC/AT personal computer. However, the use of any of the various bus architectures is also contemplated. An ISA or EISA bus master 52 is preferably connected to the I/O bus 50. The bus master 52 may be any of the type that controls the host bus 20 when the processor system is on hold, such as the system direct memory access (DMA) controller, a hard disk interface, a local area network (LAN) interface or a video graphics processor system.

The bus controller chip 46 is preferably the 82358 EISA bus controller (EBC) chip, produced by Intel Corporation. The EBC includes an input referred to as HSTRETCH*, which receives a signal from the host bus 20 and may be used to stretch or delay EISA or ISA bus cycles to guarantee that these cycles do not complete before the cache systems 26 and 28 have had an opportunity to snoop the access on the host bus 20. The EISA bus is preferably delayed by stretching the EISA bus clocking signal, referred to as BCLK, and the ISA bus is preferably delayed by use of a ready signal referred to as CHRDY, as is well known to those skilled in the art. In the preferred embodiment, all EISA cycles which access the host bus 20 are delayed. ISA bus cycles are not delayed according to the preferred embodiment because some ISA compatible bus masters do not recognize the CHRDY signal, and errors would result if these bus masters were used in a system where ISA bus cycles were delayed. Therefore, to maintain compatibility with these ISA bus masters, ISA bus cycles are not delayed in the preferred embodiment.

Figure 2:
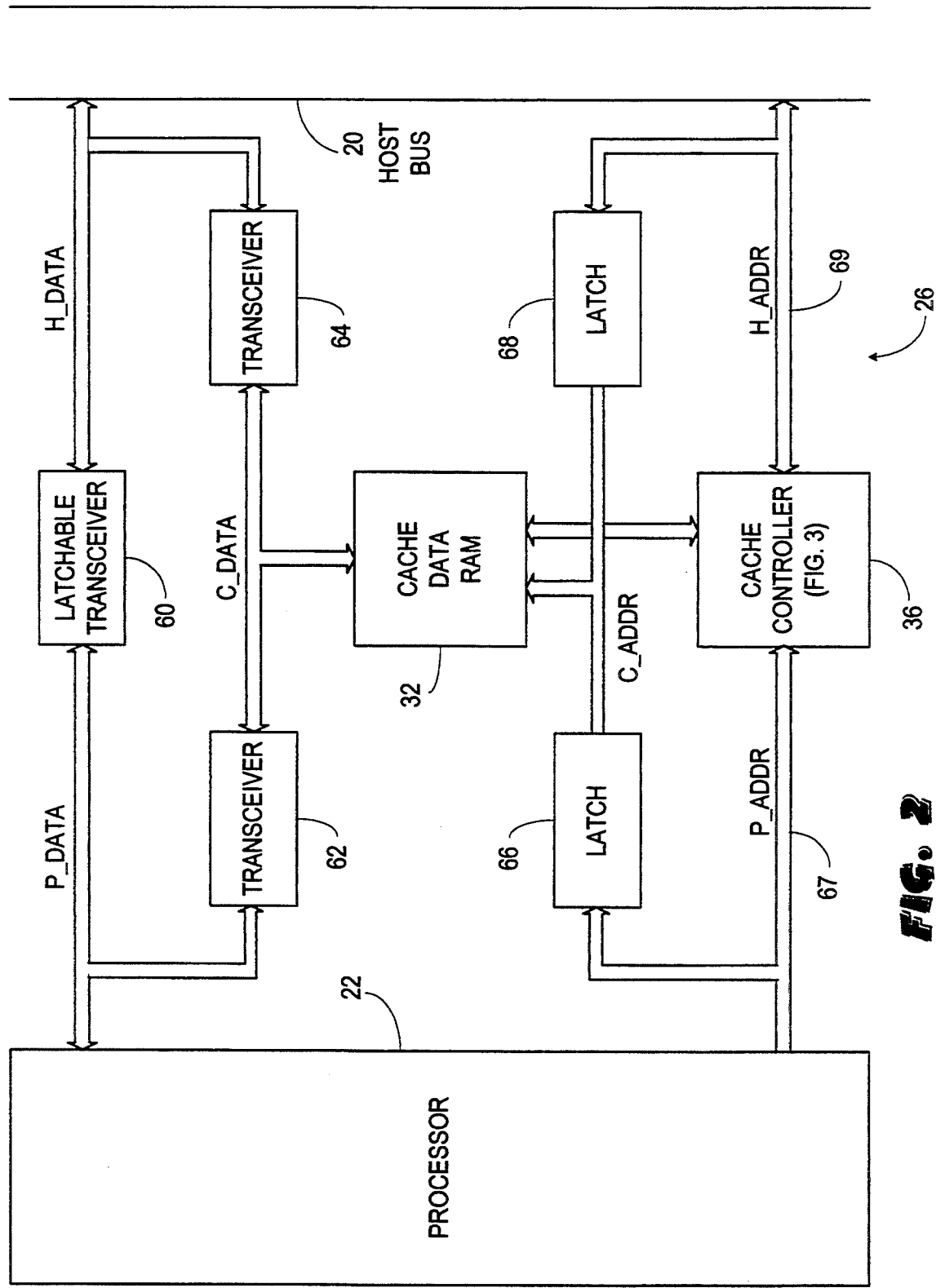
FIG. 2 depicts the data and address path organization of one of the cache systems of FIG. 1 according to the present invention.

The cache subsystems 26 and 28 are identical in the preferred embodiment, and in the following discussion the cache subsystem 26 is described in detail for simplicity. Referring now to FIG. 2, a block diagram of the cache subsystem 26 coupled to the processor 22 is shown. The cache controller 26 includes a cache data RAM 32 and a cache controller 36. The block diagram of FIG. 2 illustrates the address and data paths to the cache data RAM 32 in the cache subsystem 26. The cache subsystem 26 has a dual ported nature in that the subsystem 26 can respond to an access from its local processor 22 or to a snoop access on the host bus 20. The cache subsystem 26 includes a latchable transceiver 60 coupled between the data path from the host bus 20 to the processor 22. The cache subsystem 26 includes 32-bit transceivers 62 and 64 coupled in the data path to the cache data RAM 32 between the host bus 20 and the processor 22. The cache subsystem 26 also includes a pair of 8-bit latches 66 and 68 coupled in the address path to the cache data RAM 32 between the host bus 20 and the processor 22. The latches 66 and 68 are used to latch the lower 8 bits of the address bus to access the appropriate data entry in the cache data RAM 32.

The cache controller 36 is coupled through a processor address bus 67 to the processor 22 and is coupled through a local address bus 69 to the host bus 20. The cache controller 36 receives addresses from the processor 22 during processor accesses and receives addresses from the host bus 20 during snoop accesses. On a processor access or snoop access, the cache controller 36 compares the received address with the values in its tag RAM's to determine if the desired data entry is located in the cache 32.

Figure 3:
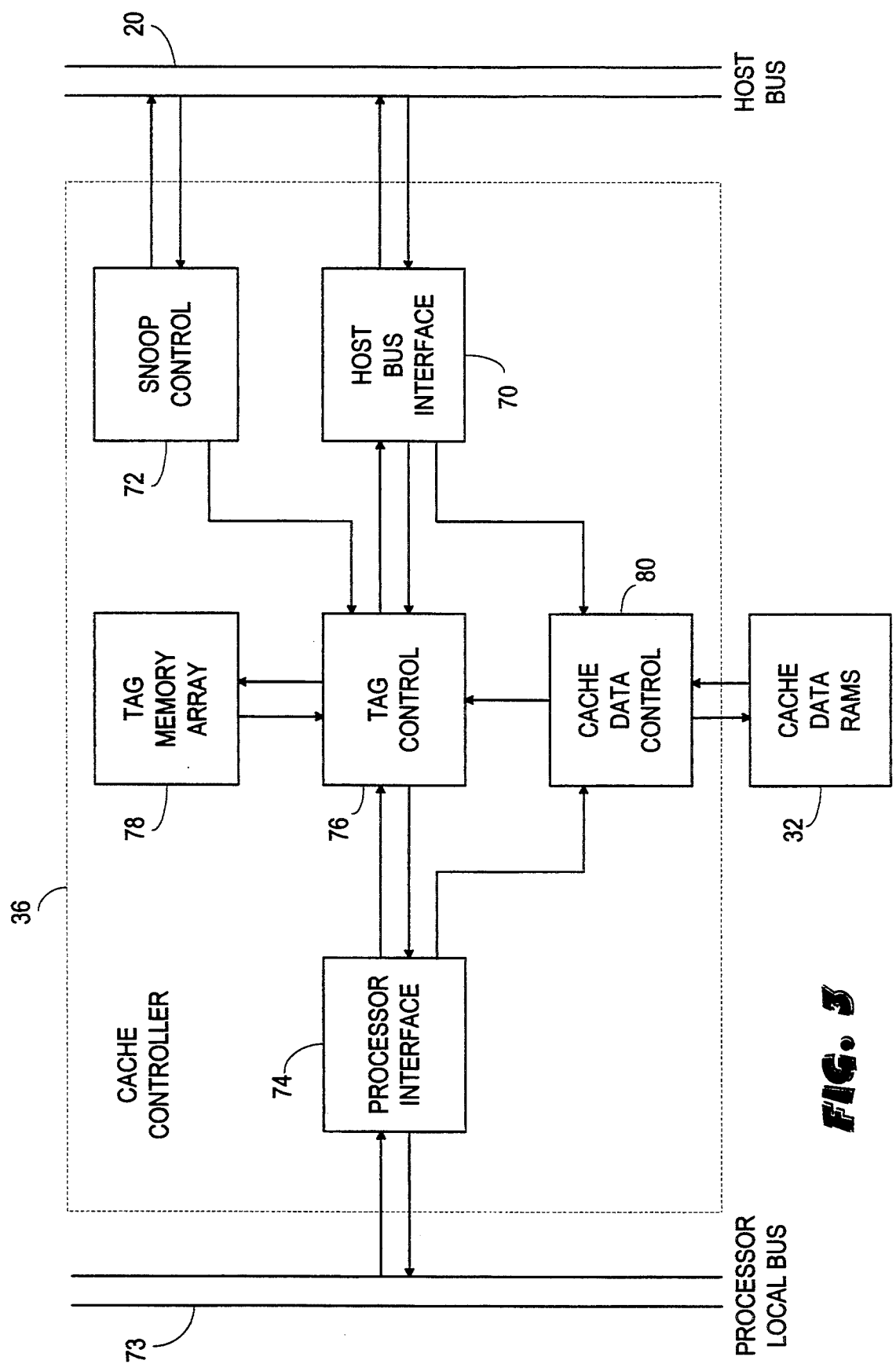
FIG. 3 is a schematic block diagram of the cache controller of FIG. 2.

Referring now to FIG. 3, a block diagram of the cache controller 36 of the present invention is shown. The cache controller 36 includes a host bus interface 70 and a snoop control 72 connected to the host bus 20. The cache controller 36 includes a processor interface 74 connected to a local processor bus 73 on the processor 22 which includes the processor address bus 67 (FIG. 2). The host bus interface 70 and processor interface 74 are each connected to a tag control block circuit 76. The tag control circuit 76 is connected to a tag memory area 78 where tag RAM's are located. The tag control block circuit 76 controls the operation of the tag RAM's 78. A cache data control block circuit 80 is connected to the processor interface 74, the host bus interface 70 and the tag control 76. The cache data control block circuit 80 is connected to the cache data RAM's 32 and controls the flow of data into and out of the cache 32.

The tag control circuit 76 receives addresses from the processor 22 through the processor interface 74 on processor read and write operations, referred to as processor accesses. The tag control circuit 76 also receives addresses from host bus cycles which require snooping through the host bus interface 70. The tag control circuit 76 compares the addresses it receives from the processor 22 or the host bus 20 with the tag values in the tag RAM's 78. The tag RAM's 78 in the preferred embodiment are preferably time multiplexed between processor cycles and host bus snoop cycles. Therefore, only one of either a processor cycle or a host bus snoop cycle has access to the tag RAM's 78 at any one time.

Figure 4:
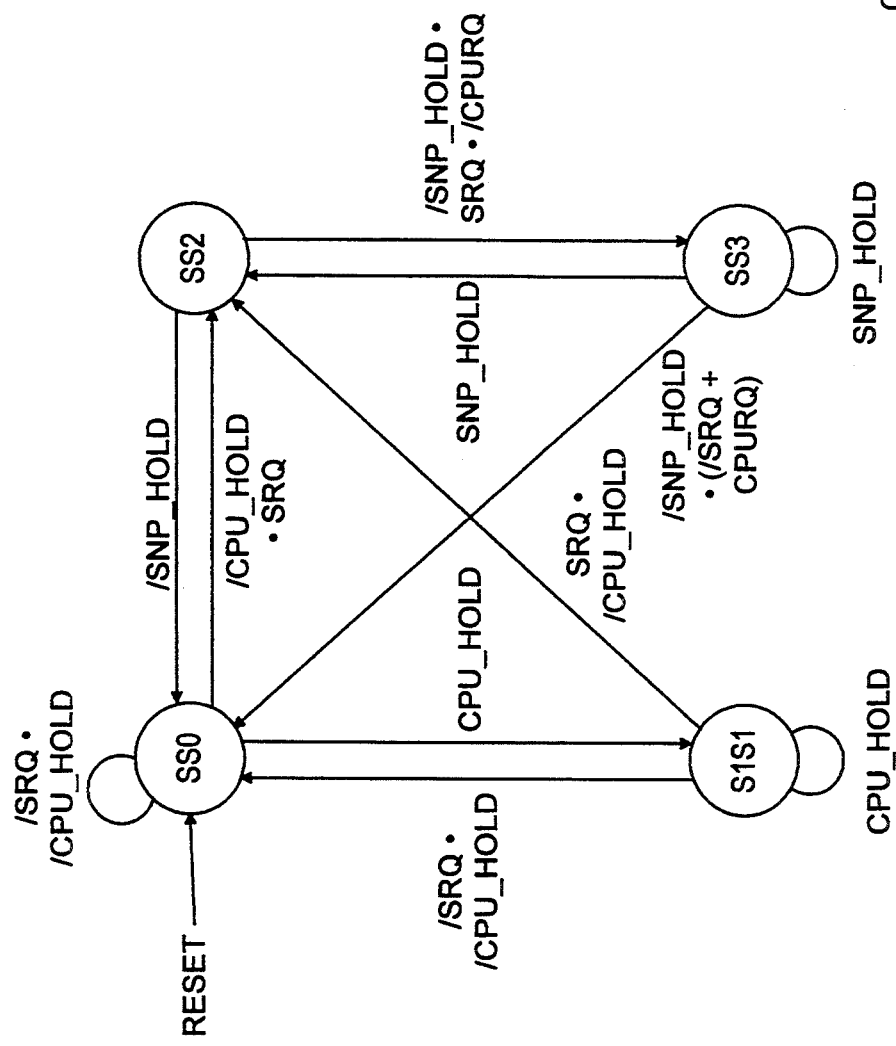
FIG. 4 is a state diagram illustrating the operation of the cache controller arbitration logic according to the present invention.

The tag control circuit 76 includes arbitration logic according to the present invention which arbitrates between processor accesses and snoop accesses to the tag RAM's 78. Referring now to FIG. 4, a state transition diagram which illustrates the operation of the cache controller arbitration logic according to the present invention is shown. A discussion of the signal names used in the state machine is deemed appropriate. The SRQ or snoop request signal is asserted high to indicate that a host bus cycle requests access to the tag RAM's 78. The CPURQ signal is asserted high to indicate that the processor 22 requests access to the tag RAM's 78. The CPU_HOLD signal is asserted high after a processor tag access to indicate that a tag modify cycle is required. The SNP_HOLD signal is asserted high after a snoop tag access to indicate that a tag modify cycle is required.

Figure 5:
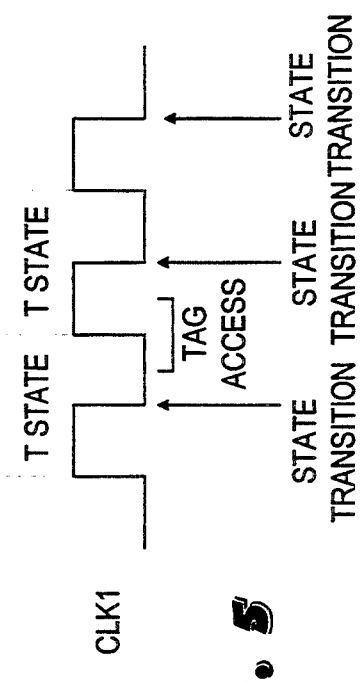
FIG. 5 is a timing diagram illustrating operation of the state machine of FIG. 4.

The cache controller 36 (FIGS. 2 and 3) generates a clocking signal referred to as CLK1 identical to a clock signal generated by the processor 22. As shown in FIG. 5, a host bus state, referred to as a T state, is defined as one period of the CLK1 signal (rising edge to rising edge). In the preferred embodiment, the state machine changes state in the middle of a T state, which is preferably the falling edge of the CLK1 signal. A processor or snoop tag access occurs on the boundary of a T state, preferably the rising edge of the CLK1 signal, and is completed before the next state transition occurs in the middle of the following T state. In addition, the CPU_HOLD or SNP_HOLD signals are generally asserted upon completion of a tag access, before the next state transition occurs, if a tag update or tag modify cycle is required. In general, most tag modify cycles require only a write cycle and therefore require only one CLK1 signal cycle to complete. The tag will have been read on the previous cycle in the determination of whether a cache hit or cache miss has occurred, and therefore a tag modify cycle generally requires only one write cycle.

Referring again to FIG. 4, the state machine includes four states referred to as SS0, SS1, SS2, and SS3. In the following discussion, signal names preceded by a backslash (/) are inverse of signal names without a backslash. The state machine begins in state SS0, and all states lead to this state when the system reset signal is asserted. In state SS0 the cache controller 36 is looking at the local processor address bus 67 for the next processor cycle access. The state machine remains in state SS0 while the condition:

/SRQ·/CPU_HOLD is true. The state machine remains in state SS0 while it does not receive a snoop request and the CPU_HOLD signal is negated. If the cache controller 36 begins servicing a processor access in state SS0, the access completes before the next state transition occurs, and the CPU_HOLD signal will be asserted if a tag update is required. The state machine progresses to state SS1 when the CPU_HOLD signal is asserted. State SS1 indicates that the cache controller 36 has completed a processor access cycle and requires a tag update. Therefore, when the cache controller 36 completes a processor access and a tag modify cycle is necessary, as indicated by the asserted CPU_HOLD signal, the state machine progresses to state SS1 for the tag update to be performed. The state machine remains in state SS1 while the CPU_HOLD signal is asserted high, during which time the tag update is being performed.

The state machine returns to state SS0 when the condition

/SRQ·/CPU_HOLD is true. The state machine returns from state SS1 to state SS0 when the tag modify cycle is completed and there is no pending snoop request. The state machine progresses from state SS1 to state SS2 when the condition:

SRQ·/CPU_HOLD is true. The state machine progresses from state SS1 to state SS2 when the cache controller 36 completes its tag update and a pending snoop request exists. Therefore, a pending snoop request is given priority upon completion of a processor access.

The state machine progresses from state SS0 to state SS2 when the condition:

SRQ·/CPU_HOLD is true. When the state machine is in state SS0 and a snoop request occurs, the state machine advances to state SS2 if the CPU_HOLD signal is negated. Therefore, if a processor access has completed and no tag update is required, or if no processor access is occurring in the T state, and a snoop request occurs, the state machine advances to state SS2. In addition, if a processor access and a snoop access both occur in state SS0 during a T state when no processor access is occurring, the state machine advances to state SS2.

In state SS2, the cache controller 36 performs a tag compare cycle in response to a snoop access from the host bus 20. The state machine returns from state SS2 to state SS0 when the condition:

/SNP_HOLD is true. The state machine returns from state SS2 to state SS0 when no tag update is required after a snoop access, signified by the SNP_HOLD signal being negated low. The state machine progresses from state SS2 to state SS3 when the SNP_HOLD signal is asserted, signifying that the snoop access is completed and a tag modify cycle is required. In state SS3, the cache controller 36 is performing a tag update after the snoop access. The state machine remains in state SS3 while the SNP_HOLD signal is asserted, during which time the tag update is being performed. The state machine returns from state SS3 to state SS2 when the condition:

/SNP_HOLD·SRQ·/CPURQ is true. The state machine returns from state SS3 to SS2 when the tag update is completed, no pending processor access request exists, and a snoop request is pending. The state machine returns from state SS3 to state SS0 when the condition:

/SNP_HOLD·(/SRQ+CPURQ)

is true. The state machine returns from state SS3 to state SS0 when the tag update is completed and either no snoop request is pending or a processor request is pending. Therefore, after the snoop access has completed, a pending processor access request is given priority over another snoop request.

When the state machine is in state SS0 and a processor access and snoop access both occur in a T state when no tag access is being performed, the snoop access has priority over the processor access, and the state machine progresses to state SS2 to perform the tag compare cycle. This grant of priority to snoop accesses when both a processor access and a snoop access occur in the same T state is desirable for snoop writes because of the possibility of several consecutive zero wait state writes on the host bus 20, which may cause a snoop address to be missed if the local processor access preceded the snoop access. As is explained below, after a snoop access has been performed, a processor access is given priority over a subsequent snoop access. Therefore, for the case of several consecutive zero wait state write cycles, the cache controller 36 preferably includes logic which can delay the host bus 20 during the second snoop write cycle after the first snoop cycle completes, inserting wait states until the processor access has completed. For more information on this host bus delay logic, see U.S. application Ser. No. 07/753,420, referenced above. Therefore, by granting priority to snoop accesses in the manner described above, a first snoop access is allowed to complete and only a second successive snoop access is delayed. The grant of priority to snoop accesses is also desirable because the processors 22 and 24 preferably do not allow processor cycle aborts, and therefore a processor access cannot be aborted to run a snoop access cycle.

Snoop accesses caused by host bus reads or writes performed by ISA or EISA bus masters also require priority over processor accesses. Host bus cycle accesses by an ISA bus master must have priority over processor accesses because the cache controller 36 must guarantee that the data requested on a snoop read can be driven back to the ISA bus in time when an inhibit cycle is required. This is necessary since the ISA bus is not delayed according to the preferred embodiment and hence has a fixed time that it can wait for a response. As previously discussed the ISA bus is preferably not delayed to maintain compatibility with some ISA bus masters which would not operate properly with delayed ISA bus cycles. EISA snoop reads do not require priority over processor accesses because the EISA bus is delayed in the preferred embodiment. However, they are given the same priority as ISA bus cycles for simplicity.

When both local processor and snoop accesses are occurring, they alternate access to the tag RAM's after arbitrating for the first access, as explained above. After a tag access by one of either the processor 22 or a host bus snoop cycle, the other has priority for the next tag access if it has a request pending and if the next tag cycle is not needed for a tag update cycle. In this instance, if both the processor 22 and the host bus 20 have an access pending immediately after completion of an access, the one which is denied access is delayed by wait states while the other performs an access to the tag RAM's. For example, if the state machine is in state SS3 performing a tag update after completion of a snoop access, and both a processor access and snoop access are pending, the state machine advances to state SS0 when the SNP_HOLD signal is negated and performs the processor access. In this manner, pending processor requests are given priority after a snoop access has completed. During the processor access, wait states are inserted into the host bus snoop cycle to guarantee that the snoop cycle does not complete until the cache controller 36 has had an opportunity to snoop that cycle. If the state machine is in state SS1 performing a tag update after completion of a processor access, and both a processor access and a snoop access are pending, the state machine advances to state SS2 when the CPU_HOLD signal is negated to perform the snoop access. During the snoop access, wait states are inserted into the processor cycle until the processor has access to the tag RAM's. This method of alternating accesses between processor and snoop accesses balances any wait states incurred between the processor 22 and the host bus 20 and ensures that neither bus is locked out by continual accesses by the other. It is noted that a processor request generally only has priority if it is pending after a snoop access has completed. Any time that a processor access request and a snoop access request both occur in state SS0 while no tag access is currently being performed, the snoop request has priority. However, if a snoop access has just completed and both a processor request and another snoop request are pending, then the processor request has priority.

As previously discussed, tag modify cycles generally always follow the tag compare cycles that initiate them. The lone exception to this rule is the instance where the processor 22 posts a write to shared data. In this instance, even though the cache data RAM 32 is written immediately, the tag state is not updated until the data is actually written to the host bus 20 and snooped by other caches on the bus. When the processor 22 posts a write to shared data, the CPU_HOLD signal is negated as if the write had actually been performed, and the tag update is performed later when the processor 22 regains access to the host bus 20. In the case where a tag modify cycle does not immediately follow the tag compare cycle that initiated it, the tag modify cycle requires a re-read of the tag and then a write cycle, thus requiring two CLK1 signal cycles in this instance. A re-read of the tag is required to ensure that the tag has not been modified by a snoop access. This fixes the problem of a modified location changing state between the time that the cache controller 36 thinks it has to write back to main memory and when the cache controller 36 is granted the host bus 20 to run the cycle.

In the preferred embodiment, a snoop write hit to a modified or owned location causes the cache data entry to be updated with the new value with no corresponding tag update. No tag update is required because the cache controller 36 simply updates its data entry with the new data, and the state of the data remains the same.

Therefore, a snoop write hit to a modified location causes the SNP_HOLD signal to be asserted for the next two tag clock cycles during the write operation, maintaining the state machine in state SS3 during this time with no tag modify cycles occurring. Therefore, a snoop write hit to a modified location causes the next two tag clock cycles to be idle, after which the processor 22 has priority if it has an access pending.

Also, a snoop read hit to a modified or owned location causes the cache controller 36 to inhibit the current memory cycle from the memory controller 42 and provide the correct data to the requesting device. In this instance, the SNP_HOLD signal is asserted during the time that the cache controller 36 is supplying the requested data. Therefore, the state machine remains in state SS3 during the time that the inhibit output is generated until a bus ready signal is returned from the snoop control block. This prevents any tag accesses from occurring during the inhibit cycle. Upon the completion of the inhibit cycle, the processor 22 is given priority if it has an access pending.

Therefore, a method for arbitrating between processor and snoop accesses is disclosed. This method grants a host bus snoop cycle access if a snoop access and a processor access both occur and no tag access or tag modify cycle is currently being performed. After a first arbitration, if any, snoop and processor access requests alternate access to the tag RAM's. This balances any wait states incurred between the processor 22 and the host bus 20 and ensures that neither is locked out by continual accesses by the other.

The foregoing disclosure and description of the invention are illustrative and explanatory thereof, and various changes in the size, components, construction and method of operation may be made without departing from the spirit of the invention.

We claim:

1. In a dual ported cache subsystem coupled in a computer system between a processor which does not allow processor cycle aborts and a host bus, said cache subsystem having a cache controller including tag memory accessed by said cache controller during processor and snoop accesses, an apparatus for arbitrating between processor and snoop accesses, comprising:
   means for monitoring the status of access requests from the host bus and the microprocessor in the form of a snoop access from said host bus and a processor access from said processor to detect their occurrence;
   means for monitoring performance of tag access requests to said tag memory by said cache controller;
   control means for granting priority to the snoop access request when a processor access and snoop access concurrently occur and no tag access request is currently being performed;
   said control means further comprising means for delaying a snoop access request until after a processor access completes when the snoop access is detected during response to the processor access request; and
   said control means further comprising means for delaying a processor access request until after a snoop access completes when the processor access is detected during response to the snoop access request.

2. The apparatus of claim 1, wherein said tag memory is updated by tag modify cycles performed by said cache controller on some of said processor and snoop access requests, further comprising:
   means for performing a tag modify cycle immediately after a tag access when the tag modify cycle is required.

3. The apparatus of claim 2, wherein said computer system comprises a multiprocessor system including a second cache subsystem coupled to said host bus, and wherein said dual ported cache subsystem includes cache memory which stores data entries, said control means further comprising:
   means for delaying performing a tag modify cycle after said processor posts a write to a data entry shared with said second cache subsystem until said cache controller gains control of said host bus.

4. The apparatus of claim 3, wherein said computer system includes an input/output bus coupled to said host bus and a device having a fixed time for response on said input/output bus, said device also running cycles on said host bus and causing snoop accesses.

5. The apparatus of claim 2, wherein the processor and snoop accesses further include tag access cycles, said control means further comprising:
   means for delaying performance of tag access cycles, after a snoop access write hit to a modified data entry, until said cache controller updates the modified data entry.

6. The apparatus of claim 2, wherein the processor and snoop accesses further include tag access cycles and wherein said cache controller performs an inhibit cycle after a snoop access read hit to a modified data entry, said control means further comprising:
   means for delaying performance of tag access cycles, after tag access cycles comprising a snoop access read hit to a modified data entry, until the inhibit cycle completes.

7. The apparatus of claim 1, wherein said control means further includes:
   means for alternating access to said tag memory between snoop access requests and processor access requests subsequent to said control means granting priority to the snoop access request.

8. The apparatus of claim 1, wherein one of the access requests being monitored from the host bus and the processor is detected while a tag access request is being performed, said control means including:
   means for delaying the detected access request until performance of the tag access request is completed.

9. A method for arbitrating between processor and snoop accesses from a processor which does not allow processor cycle aborts and a host bus in a dual ported cache subsystem in a computer system, the cache subsystem having a cache controller which includes tag memory that is accessed by the cache controller during processor and snoop accesses, the method comprising the steps of:
   monitoring the status of access requests from the host bus and processor in the form of a snoop access from the host bus and a processor access from the processor to detect their occurrence;
   monitoring performance of tag access requests to the tag memory by the cache controller;
   granting priority to the snoop access request when a processor access and snoop access concurrently occur and no tag access request is currently being performed;
   delaying performance of a snoop access request until after a processor access completes when the snoop access is detected during response to the processor access request; and delaying performance of a processor access request until after a snoop access completes when the processor access is detected during response to the snoop access request.

10. The method of claim 9, wherein the tag memory is updated by tag modify cycles performed by the cache controller on some of said processor and snoop access requests, the method further comprising:

performing a tag modify cycle immediately after a tag access when the tag modify cycle is required.

11. The method of claim 10, wherein the processor and snoop accesses further include tag access cycles and wherein the cache controller performs an inhibit cycle after a snoop access read hit to a modified data entry, the method further comprising:

delaying performance of tag access cycles, after tag access cycles comprising a snoop access read hit to a modified data entry, until the inhibit cycle completes.

12. The method of claim 11, wherein the computer system includes an input/output bus coupled to the host bus and a device having a fixed time for response on the input/output bus, said device also running cycles on the host bus and causing snoop accesses.

13. The method of claim 10, wherein the computer system is a multiprocessor system which includes a second cache subsystem coupled to the host bus, and wherein the dual ported cache subsystem includes cache memory which stores data entries, the method further comprising:

delaying performing a tag modify cycle after the processor posts a write to a data entry that is shared with the second cache subsystem until the cache controller gains control of the host bus.

14. The method of claim 10, wherein the processor and snoop accesses further include tag access cycles, the method further comprising:

delaying performance of tag access cycles, after a snoop access write hit to a modified data entry, until the cache controller updates the modified data entry.

15. The method of claim 9, further including the step of:

alternating access to the tag memory between snoop access requests and processor access requests subsequent to performing said step of granting priority to the snoop access request.

16. The method of claim 1, wherein one of the test bus and processor access requests being monitored is detected while a tag access request is being performed, and further including the step of:

delaying the detected access request until performance of the tag access request is completed.

* * * * *